United States Patent
Francis (10) Patent No.: US 8,179,319 B1
(45) Date of Patent: May 15, 2012

(54) ADAPTIVE OPTIMIZATION OF ESTIMATION OF THE ANGLE OF ARRIVAL OF A SIGNAL RECEIVED BY AN ARRAY OF ANTENNA ELEMENTS

(75) Inventor: James Covosso Francis, Honeoye Falls, NY (US)

(73) Assignee: L-3 Services, Inc., San Diego, CA (US)

(*) Notice: Subject to any disclaimer, the term of this patent is extended or adjusted under 35 U.S.C. 154(b) by 395 days.

(21) Appl. No.: 12/337,219

(22) Filed: Dec. 17, 2008

(51) Int. Cl.
*G01S 5/02* (2010.01)
*G01S 5/04* (2006.01)

(52) U.S. Cl. .......................... 342/417; 342/445

(58) Field of Classification Search ............... 342/417, 342/424, 437, 442, 445
See application file for complete search history.

(56) References Cited

U.S. PATENT DOCUMENTS

| | | | | |
|---|---|---|---|---|
| 6,377,214 | B1* | 4/2002 | Melville et al. | 342/442 |
| 7,982,670 | B2* | 7/2011 | Mestre Pons | 342/417 |
| 2003/0001778 | A1* | 1/2003 | Benner et al. | 342/451 |

* cited by examiner

*Primary Examiner* — Dao Phan
(74) *Attorney, Agent, or Firm* — Edward W. Callan (57) ABSTRACT

A parameter of interest of a signal, such as the angle of arrival of a target signal received by an antenna system having an array of antenna elements, is estimated by (a) obtaining disparate observations of the target signal received by the antenna system; (b) with a computer, processing the disparate observations of the target signal to determine a subset of a set of possible further obtained disparate observations of the target signal for processing to enable an optimal estimation of the angle of arrival of the target signal; (c) obtaining the subset of further disparate observations of the signal; and (d) processing the obtained subset of further obtained disparate observations to obtain the optimal estimate of the parameter of interest.

26 Claims, 1 Drawing Sheet

ADAPTIVE OPTIMIZATION OF ESTIMATION OF THE ANGLE OF ARRIVAL OF A SIGNAL RECEIVED BY AN ARRAY OF ANTENNA ELEMENTS

BACKGROUND OF THE INVENTION

The present invention generally pertains to estimating a parameter of interest of a received signal and is particularly directed to estimating the angle of arrival (AOA) of a target signal received by an antenna system, such as an array of antenna elements.

Arrays of antenna elements are commonly used in a system for estimating the AOA of a received target signal. For tactical signal-intercept applications it is desirable for the signal-intercept hardware to be of minimal size, weight, and power (SWAP). To realize minimal SWAP it is desirable to use a single tuner and to commutate the antenna elements of the array.

SUMMARY OF THE INVENTION

The present invention provides a method of estimating the angle of arrival of a target signal received by an antenna system, comprising the steps of:

(a) obtaining disparate observations of a target signal received by an antenna system; and (b) with a computer, processing the obtained disparate observations of the signal to select a subset of said disparate observations of the signal for processing to enable an optimal estimation of the angle of arrival of the signal.

The above-described method is used for estimating the angle of arrival of a target signal received by an antenna system, wherein step (a) comprises obtaining disparate observations of a target signal received by the antenna system; and wherein step (b) comprises processing the disparate observations of the target signal to determine a subset of a set of possible further obtained disparate observations of the target signal for processing to enable an optimal estimation of the angle of arrival of the target signal.

The present invention additionally provides a system for performing the above-described method and computer readable storage media including computer executable program instructions for causing one or more computers to perform and/or enable the steps of the respective above-described method.

Additional features of the present invention are described with reference to the detailed description.

DETAILED DESCRIPTION

Figure 1:
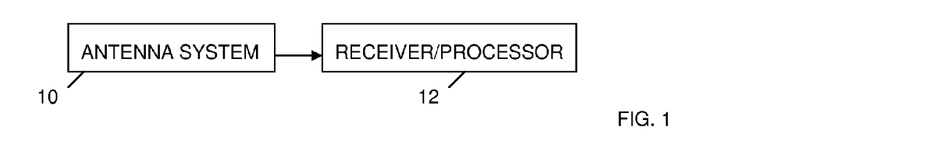
FIG. 1 is a block diagram of an exemplary system in which the method of the present invention is performed.

Referring to FIG. 1, an exemplary system in which the method of the present invention is performed includes an antenna system 10 and a signal receiver/processor 12. In various embodiments the antenna system includes separate antennas and/or separate arrays of antenna elements, such as commutated antenna elements. The receiver/processor 12 includes a computer. The computer contains a digital signal processor and computer readable storage media that includes computer executable program instructions for causing the computer to perform and/or enable the various processing steps that are described herein. These instructions are stored in the computer readable storage media of the computer when the computer is manufactured and/or upon being downloaded via the Internet or from a portable computer readable storage media containing such instructions.

Figure 2:
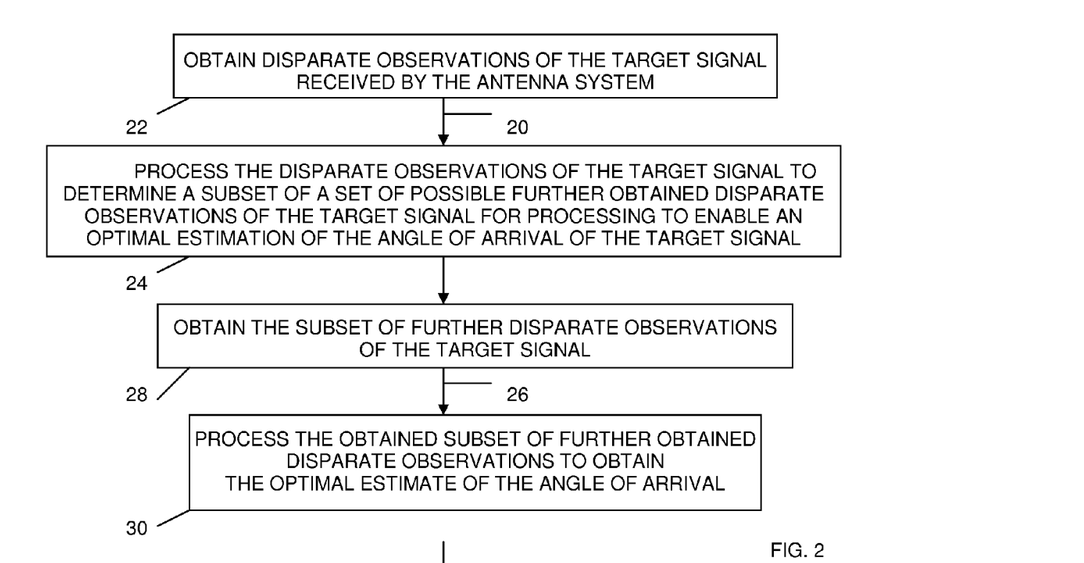
FIG. 2 is a diagram generally showing the method of the present invention.

Referring to FIG. 2, disparate observations 20 of the target signal received by the antenna system 10 are obtained by the receiver/processor 12, as shown at 22. It is assumed that the disparate observations 20 of the received target signal are observed in zero-mean additive white Gaussian noise (AWGN).

The disparate observations 20 are obtained at different times, at different frequencies and/or by using different CDMA signal access codes. The disparate observations 20 are obtained from different antenna elements of the antenna system 10. In an exemplary embodiment, the disparate observations are obtained from different elements of a commutated antenna array of the antenna system 10.

Each observation includes a plurality of samples of the received target signal that are taken over an interval that is a reciprocal of the bandwidth of the target signal. In an exemplary embodiment, the number of samples taken over each observation interval is one-hundred. In other embodiments, other numbers of samples are taken during each observation interval.

The disparate observations 20 of the received target signal are processed, as shown at 24, to determine a subset of a set of possible further obtained disparate observations of the target signal for processing to enable an optimal estimation of the angle of arrival of the target signal.

The subset 26 of further disparate observations of the signal is obtained, as shown at 28; and the obtained subset 26 of further obtained disparate observations is processed to obtain the optimal estimate of the parameter of interest, as shown at 30.

Figure 3:
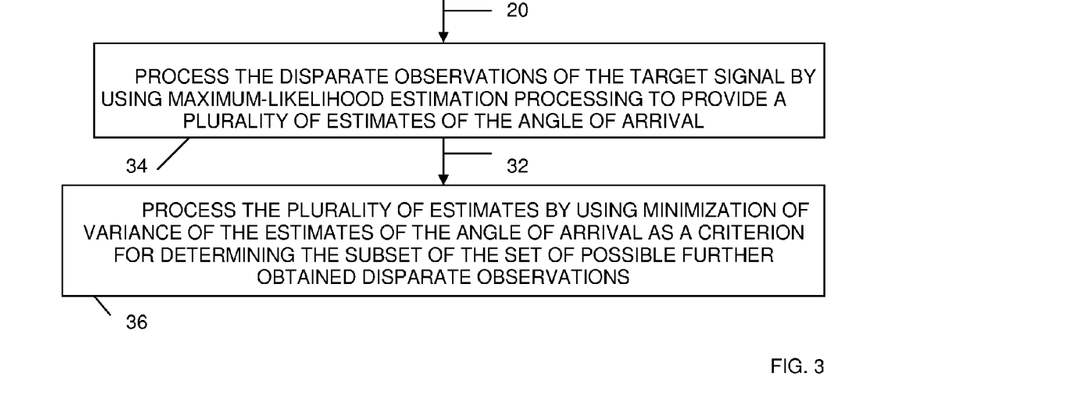
FIG. 3 is a diagram showing further details of one of the steps of the method shown in FIG. 2.

The processing 24 of the disparate observations 20 to determine the subset is described with reference to FIG. 3. The disparate observations 20 are processed by using maximum-likelihood-estimation (MLE) processing to provide a plurality of estimates 32 of the angle of arrival, as shown at 34; and the plurality of estimates 32 are processed by using minimum variance of the estimates as a criterion for determining the subset of the set of possible further obtained disparate observations, as shown at 36. The plurality of estimates 42 is used to construct a probability density function of the angle of arrival.

Consider the case of an N-element Uniform Circular Array (UCA). The response $y_k(t)$ by an element of the antenna array to the received target signal is a complex signal having a modulus (amplitude) and an argument (angle), to wit:

$$y_k(t) = e^{i\psi_k} \times z(t) e^{i2\pi ft} \qquad \text{[Eq. 1]}$$

wherein $$\psi_k = 2\pi \frac{r}{\lambda} \sin\left(\phi - \frac{\pi}{2} - k\frac{2\pi}{N}\right) \qquad \text{[Eq. 2]}$$

In Equation 1, $\psi_k$ is the phase difference of antenna element k; k is an integer representing the angular disposition of the antenna element; f is the center frequency of the received signal; and $z(t)e^{i2\pi ft}$ is the received signal that would be measured at the center of the array (i.e. at the origin). z(t) is due to modulation of the target signal. It is assumed that, while z(t) is a function of time, z(t) is approximately constant over a time of 2r/c, wherein r is the radius of the array of antenna elements and c is the speed of light. $\psi_k$ is the phase change that results from moving from the center of the array to the position of element k at time t. The antenna elements k are uniformly distributed over 360 degrees.

In Equation 2, $\phi$ is the angle of arrival of the received signal; r is the radius of the array of antenna elements; and N is a number representing the number of elements in the array. On a line $d_k$ passing through the origin of the angle of arrival $\phi$, the phase of the received signal is a constant. The phase difference $\psi_k$ of antenna element k may be computed by determining the distance from element k to the line $d_k$. Then, $\psi_k = 2\pi d_k / \lambda$, where $\lambda = 1/f$ is the wavelength of the received signal. All points that are at a distance that is an integral multiple of $\lambda$ from the line of angle $\phi$ have the same phase as points on the line of angle $\phi$.) $d_k = r|\sin(\theta_k - \phi)|$ where $\theta_k$ is the angular position of element k. For this array configuration, $$\theta_k = \frac{\pi}{2} + k \frac{2\pi}{N}.$$

The sign difference of $\sin(\theta_k - \phi)$ is understood by considering two elements, one at (+r, 0) and one at (−r, 0). For an angle of arrival $\phi$ that is small and only slightly greater than 0, the phase differences are moving linearly away from zero with opposite signs. For a four-element array (N=4), k is an integer in a series of 1 through 4. For an eight-element array (N=8), k is an integer in a series of 1 through 8.

Consider first the case where the modulation of the target signal is completely known. Within a known complex factor, the response of an antenna array to a received target signal may be written as, $$y_k(t) = e^{i\psi_k} \qquad [\text{Eq. 3}]$$

Suppose additionally that N=4. Then either $y_k(t) = e^{\pm \mu \cos(\phi)i}$ or $y_k(t) = e^{\pm \mu \sin(\phi)i}$, depending on k. $\mu$ is a constant that depends on the frequency of the target signal but is independent of $\phi$. It is desired to estimate the angle-of-arrival $\phi$, and it is assumed that $y_k(t)$ is observed in the presence of AWGN.

Which of the antenna array elements are sampled to provide the disparate observations 22 is determined to optimize the estimation of the angle of arrival $\phi$. One must determine whether it is more advantageous to sample $y_k(t) = e^{\pm \mu \cos(\phi)i}$ or to sample $y_k(t) = e^{\pm \mu \sin(\phi)i}$. Suppose $\phi \approx 0$. Since for small $\phi$ $\sin(\phi) \approx \phi$ and $\cos(\phi) \approx 1$, one might hypothesize that it is better to sample $y_k(t) = e^{\pm \mu \sin(\phi)i}$, since $y_k(t) = e^{\pm \mu \cos(\phi)i}$ has little dependence on $\phi$. (One cannot estimate a parameter if what is observed does not depend on the parameter.) In fact, for a small $\phi$ it is better to observe $y_k(t) = e^{\pm \mu \sin(\phi)i}$. Likewise, when $\phi$ is near ninety-degrees, it is better to observe $y_k(t) = e^{\pm \mu \cos(\phi)i}$.

For a slightly simplified case, $$y = e^{i\cos(\phi)} + v \qquad [\text{Eq. 4}]$$

wherein v is random noise and the probability density function of v is given by, $$f_V(v) = \frac{1}{2\pi\sigma^2} e^{-\frac{|v|^2}{2\sigma^2}} \qquad [\text{Eq. 5}]$$

and, wherein $\sigma$ characterizes the variance of distribution of the random noise v.

Maximum-likelihood estimation (MLE) processing is used to estimate the angle of arrival $\phi$ of the target signal. During the step 34 of processing the disparate observations 20 of the received target signal, the MLE of the angle of arrival $\phi$ of the target signal is determined in accordance with the equation:

$$\phi_{MLE} = \arg\min_\phi |y - e^{i\cos(\phi)}|^2 \qquad [\text{Eq. 6}]$$

During the step 36 of processing the estimates 32 to determine which of the estimates 32 is an optimal estimation of the angle of arrival $\phi$, the variance of the estimates of the angle of arrival $\phi$ is determined by using a Cramer-Rao bound derived from a prior determination of a particular estimate as an optimal estimation of the angle of arrival.

The closed-form variance of an efficient estimator of $\phi$ may be computed using the Cramer-Rao bound, and $$\text{Var}\{\phi_{MLE}\} \geq \frac{-1}{E\left\{\frac{\partial^2}{\partial \phi^2} \log p(y \mid \phi)\right\}} \qquad [\text{Eq. 7}]$$

$$p(y \mid \phi) = f_V(y - e^{i\cos(\phi)}) \qquad [\text{Eq. 8}]$$

$$\Rightarrow p(y \mid \phi) = \frac{1}{2\pi\sigma^2} e^{-\frac{|y - e^{i\cos(\phi)}|^2}{2\sigma^2}}$$

$$\Rightarrow \log p(y \mid \phi) = -\frac{|y - e^{i\cos(\phi)}|^2}{2\sigma^2} - \log(2\pi\sigma^2)$$

$$\Rightarrow \frac{\partial^2}{\partial \phi^2} \log p(y \mid \phi) = -\frac{1}{2\sigma^2} \frac{\partial^2}{\partial \phi^2} |y - e^{i\cos(\phi)}|^2$$

Since, $$|y - e^{i\cos(\phi)}|^2 = |y|^2 - 2\text{Re}\{\bar{y} e^{i\cos(\phi)}\} + 1 \qquad [\text{Eq. 9}]$$

$$\Rightarrow \frac{\partial^2}{\partial \phi^2} |y - e^{i\cos(\phi)}|^2 = -2\text{Re}\left\{\bar{y} \frac{\partial^2}{\partial \phi^2} e^{i\cos(\phi)}\right\}$$

$$\Rightarrow \frac{\partial^2}{\partial \phi^2} \log p(y \mid \phi) = \frac{1}{\sigma^2} \text{Re}\left\{\bar{y} \frac{\partial^2}{\partial \phi^2} e^{i\cos(\phi)}\right\}$$

$$E\left\{\frac{\partial^2}{\partial \phi^2} \log p(y \mid \phi)\right\} = \qquad [\text{Eq. 10}]$$

$$\frac{1}{\sigma^2} \int_{-\infty}^{+\infty} \int_{-\infty}^{+\infty} \text{Re}\left\{\overline{a + ib} \frac{\partial^2}{\partial \phi^2} e^{i\cos(\phi)}\right\} f_V(a + ib - e^{i\cos(\phi)})$$

$$da\, db =$$

$$\frac{1}{\sigma^2} \int_{-\infty}^{+\infty} \int_{-\infty}^{+\infty} \text{Re}\left\{\overline{a + ib + e^{i\cos(\phi)}} \frac{\partial^2}{\partial \phi^2} e^{i\cos(\phi)}\right\} f_V(a + ib)$$

$$da\, db = \frac{1}{\sigma^2} \text{Re}\left\{\int_{-\infty}^{+\infty} \int_{-\infty}^{+\infty} \overline{a + ib + e^{i\cos(\phi)}} \frac{\partial^2}{\partial \phi^2} \right.$$

$$\left. e^{i\cos(\phi)} f_V(a + ib)\, da\, db \right\} = \frac{1}{\sigma^2} \text{Re}\left\{\frac{\partial^2}{\partial \phi^2} e^{i\cos(\phi)} \right.$$

$$\left. \int_{-\infty}^{+\infty} \int_{-\infty}^{+\infty} \overline{a + ib + e^{i\cos(\phi)}} f_V(a + ib)\, da\, db\right\}$$

Recalling that $f_V$ is a probability density function, $$\int_{-\infty}^{+\infty} \int_{-\infty}^{+\infty} \overline{a + ib}\, f_V(a + ib) da\, db = 0 \qquad (\text{Eq. 11})$$

and that $$\int_{-\infty}^{+\infty}\int_{-\infty}^{+\infty} f_V(a+ib)dadb = 1 \quad \text{[Eq. 12]}$$

Equation 12 reduces to, $$E\left\{\frac{\partial^2}{\partial\phi^2}\log p(y|\phi)\right\} = \frac{1}{\sigma^2}\text{Re}\left\{\overline{e^{i\cos(\phi)}}\frac{\partial^2}{\partial\phi^2}e^{i\cos(\phi)}\right\} \quad \text{[Eq. 13]}$$

The notation E means expectation and the notation Var means variance.
Using the result in Equation 13, Equation 7 may be rewritten as, $$\text{Var}\{\phi_{MLE}\} \geq \frac{\sigma^2}{-\text{Re}\left\{\overline{e^{i\cos(\phi)}}\frac{\partial^2}{\partial\phi^2}e^{i\cos(\phi)}\right\}} \quad \text{[Eq. 14]}$$

With multiple observations Equation 4 may be rewritten in a vector form as, $$y = x + v \quad \text{[Eq. 15]}$$

and it may be shown that in this vector formulation Equation 14 becomes, $$\text{Var}\{\phi_{MLE}\} \geq \frac{\sigma^2}{-\text{Re}\left\{\overline{x}\frac{\partial^2}{\partial\phi^2}x\right\}} \quad \text{[Eq. 16]}$$

Equation 16 is seen to be consistent with the scalar case of Equation 14.

Consider next a case where the modulation of the target signal is completely known. In a manner similar to Equation 15, the response of an antenna array to a received target signal may be written as, $$y = xz + v \quad \text{[Eq. 17]}$$

with $$x = \begin{pmatrix} e^{i\cos(\phi+\tau_1)} \\ e^{i\cos(\phi+\tau_2)} \end{pmatrix} \quad \text{[Eq. 18]}$$

The signal response y is observed across a single boundary. For a commutated array of antenna elements, the first tuple of y is observed immediately before a commutation boundary, and the second tuple of y is observed immediately after the commutation boundary. z is a complex scalar that represents the unknown target modulation, and $\phi$ is a real scalar that represents the AOA. T is determined by the particular disparate observation of the target signal. It is desired to estimate the AOA $\phi$, and in order to do so, it is also necessary to estimate z.

Alternatively, the problem may be extended to a more general case. Suppose that instead of a single boundary there are two boundaries. Then, $$y = Xz + v \quad \text{[Eq. 19]}$$

with $$X = \begin{pmatrix} e^{i\cos(\phi+\tau_1)} & \\ e^{i\cos(\phi+\tau_2)} & \\ & e^{i\cos(\phi+\tau_3)} \\ & e^{i\cos(\phi+\tau_4)} \end{pmatrix} \quad \text{[Eq. 20]}$$

where z is a complex vector of length two.
Analogous with equation 6, $$\phi_{MLE} = \text{argmin}_\phi \|y - Xz\|^2 \quad \text{[Eq. 21]}$$

and it may be shown that, $$\phi_{MLE} = \text{argmax}_\phi \|X^*y\|^2 \quad \text{[Eq. 22]}$$

$$z_{MLE} = \frac{1}{k}X^*y$$

for a scalar k. Observe that $X^*X = kI$, and here in fact, k=2. For different values of $\phi \|X^*y\|^2$ may be interpreted as a spatial filter.

During the step 34 of processing the disparate observations 20 of the received target signal to obtain a plurality of estimates 32 of the AOA $\phi$, the MLE of the AOA $\phi$ of the target signal is determined in accordance with the equation:

$$\phi_{MLE} = \text{argmin}_\phi \|y - Xz\|^2 \quad \text{[Eq. 23]}$$

wherein $$y = Xz + v \quad \text{[Eq. 24]}$$

$$X = \begin{pmatrix} e^{i\cos(\phi+\tau_1)} & \\ e^{i\cos(\phi+\tau_2)} & \\ & e^{i\cos(\phi+\tau_3)} \\ & e^{i\cos(\phi+\tau_4)} \end{pmatrix} \quad \text{[Eq. 25]}$$

z is a complex vector of length two that represents unknown modulation of the target signal, v is random noise, and T is determined by the particular disparate observation of the target signal.

The closed-form variance of an efficient estimation of $\phi$ may again be computed using the Cramer-Rao bounds. Here it is necessary to use the formulation for multiple parameters. Let $\alpha$ denote a vector of the parameters being estimated. Then, $$\text{Var}\{\alpha_i\} \geq \psi_{i,i} \quad \text{[Eq. 26]}$$

$$\psi = \gamma^{-1}$$

$$\gamma_{i,j} = -E\left\{\frac{\partial^2}{\partial\alpha_i\partial\alpha_j}\log p(y|\alpha)\right\}$$

As in the previous development of Equation 8, $$p(y \mid \alpha) = \qquad \text{[Eq. 27]}$$

$$f\nu(y - Xz) \Rightarrow p(y \mid \alpha) = \frac{1}{(2\pi\sigma^2)^N} e^{-\frac{\|y-Xz\|^2}{2\sigma^2}} \Rightarrow \log p(y \mid \alpha) =$$

$$-\frac{\|y-Xz\|^2}{2\sigma^2} - N\log(2\pi\sigma^2) \Rightarrow \frac{\partial^2}{\partial\alpha_i \partial\alpha_j} \log p(y \mid \alpha) =$$

$$-\frac{1}{2\sigma^2} \frac{\partial^2}{\partial\alpha_i \partial\alpha_j} \|y-Xz\|^2$$

and, $$\|y - Xz\|^2 = \|y\|^2 - 2\operatorname{Re}\{y^*Xz\} + k\|z\|^2 \Rightarrow \frac{\partial^2}{\partial\alpha_i \partial\alpha_j} \|y-Xz\|^2 = \quad \text{[Eq. 28]}$$

$$-2\operatorname{Re}\left\{y^* \frac{\partial^2}{\partial\alpha_i \partial\alpha_j} Xz\right\} + k\frac{\partial^2}{\partial\alpha_i \partial\alpha_j} \|z\|^2 \Rightarrow$$

$$\frac{\partial^2}{\partial\alpha_i \partial\alpha_j} \log p(y \mid \alpha) =$$

$$\frac{1}{\sigma^2} \operatorname{Re}\left\{y^* \frac{\partial^2}{\partial\alpha_i \partial\alpha_j} Xz\right\} - \frac{k}{2\sigma^2} \frac{\partial^2}{\partial\alpha_i \partial\alpha_j} \|z\|^2$$

The expectation of the terms in equation 28 may be computed separately. The first term is evaluated in a manner analogous to the development of equation 10, $$E\left\{\frac{1}{\sigma^2} \operatorname{Re}\left\{y^* \frac{\partial^2}{\partial\alpha_i \partial\alpha_j} Xz\right\}\right\} = \qquad \text{[Eq. 29]}$$

$$\frac{1}{\sigma^2} \int_{\mathbb{C}^N} \operatorname{Re}\left\{y^* \frac{\partial^2}{\partial\alpha_i \partial\alpha_j} Xz\right\} f\nu(y - Xz) dy =$$

$$\frac{1}{\sigma^2} \int_{\mathbb{C}^N} \operatorname{Re}\left\{(y + Xz)^* \frac{\partial^2}{\partial\alpha_i \partial\alpha_j} Xz\right\} f\nu(y) dy =$$

$$\frac{1}{\sigma^2} Re\left\{\int_{\mathbb{C}^N} (y + Xz)^* \frac{\partial^2}{\partial\alpha_i \partial\alpha_j} Xz \, f\nu(y) dy\right\} =$$

$$\frac{1}{\sigma^2} \operatorname{Re}\left\{\frac{\partial^2}{\partial\alpha_i \partial\alpha_j} Xz \int_{\mathbb{C}^N} (y + Xz)^* f\nu(y) dy\right\} =$$

$$\frac{1}{\sigma^2} \operatorname{Re}\left\{(Xz)^* \frac{\partial^2}{\partial\alpha_i \partial\alpha_j} Xz\right\}$$

whereas the second term is independent of y, $$E\left\{\frac{\partial^2}{\partial\alpha_i \partial\alpha_j} \log p(y \mid \alpha)\right\} = \qquad \text{\{Eq. 30\}}$$

$$\frac{1}{\sigma^2} \operatorname{Re}\left\{(Xz)^* \frac{\partial^2}{\partial\alpha_i \partial\alpha_j} Xz\right\} - \frac{k}{2\sigma^2} \frac{\partial^2}{\partial\alpha_i \partial\alpha_j} \|z\|^2$$

$\sigma^2$ is the variance of distribution of random noise, and k is a scalar. Note that this k is different from the k that is a number representing the angular disposition of the element of the antenna system from which the observation is obtained, as used in Equation 2.

Equations 26 and 30 are sufficient to compute a bound on the $\operatorname{Var}\{\phi_{MLE}\}$.

In the remaining discussion it will be assumed without loss of generality that $\alpha = (\phi, \operatorname{Re} z_0, \operatorname{Im} z_0, \operatorname{Re} z_1, \operatorname{Im} z_1, \ldots)$.

A couple of comments are in order regarding the structure of the matrix $\gamma$. First, the resulting matrix $\gamma$ is sparse, and may be nonzero only in the first column, the first row, and on the main diagonal. Additionally, $\gamma$ is constant on the main diagonal (other than the upper-left entry). To see this, consider the expression $$\frac{\partial^2}{\partial\alpha_i \partial\alpha_j} Xz$$

in Equation 30. This expression is linear in $\operatorname{Re} z_n$ and $\operatorname{Im} z_n$. Consequently, if $\alpha_i \neq \phi$ and $\alpha_j \neq \phi$, this expression will be zero. Hence, $$\frac{1}{\sigma^2} \operatorname{Re}\left\{(Xz)^* \frac{\partial^2}{\partial\alpha_i \partial\alpha_j} Xz\right\}$$

can only be nonzero in the first row or column of $\gamma$. Alternatively, consider the expression $$\frac{k}{2\sigma^2} \frac{\partial^2}{\partial\alpha_i \partial\alpha_j} \|z\|^2$$

in Equation 30. Since $$\|z\|^2 = \sum_n (\operatorname{Re} z_n)^2 + (\operatorname{Im} z_n)^2, \frac{\partial^2}{\partial\alpha_i \partial\alpha_j} \|z\|^2$$

will be nonzero only when $\alpha_i = \alpha_j$ and $\alpha_i, \alpha_j \neq \phi$. Hence, $$\frac{k}{2\sigma^2} \frac{\partial^2}{\partial\alpha_i \partial\alpha_j} \|z\|^2$$

can only be nonzero on the main diagonal of $\gamma$, other than the upper-left entry.

Suppose that $\phi$ is approximately known from previous observations and it is desired to make additional observations in an optimal manner. One may determine the optimal X that minimizes the bound from equations 26 and 30, noting, of course, that X is a function of $\phi$. In other words, $$X = \operatorname{argmin}_X \psi_{0,0} \qquad \text{[Eq. 31]}$$

Recall that $\alpha_0 = \phi$. Note also that because $$\frac{1}{\sigma^2}$$

appears linearly in Equation 30, the optimal X does not depend upon the signal-to-noise ratio. This provides a method for adaptively optimizing the commutation sequence. Given prior observations, one computes $\phi_{MLE}$ and then uses $\phi = \phi_{MLE}$ to compute the argmin of Equation 31 over a subset of candidate commutation sequences.

It has been demonstrated that the matrix $\gamma$ is sparse, and may be nonzero only in the first column, the first row, and on the main diagonal. Additionally, $\gamma$ is constant on the main diagonal (other than the upper-left entry).

In Equation 31, $\psi_{0,0}$ is required for various is the first column of the inverse of $\gamma$. Thus, $$\gamma \psi_{*,0} = \begin{pmatrix} 1 \\ 0 \\ 0 \\ 0 \\ \vdots \end{pmatrix} \quad [\text{Eq. 32}]$$

and the matrix $\gamma$ is of the form, $$\gamma = \begin{pmatrix} \beta_0 & \beta_1 & \beta_2 & \beta_3 & \dots & \beta_{n-1} \\ \beta_1 & d & 0 & 0 & \dots & 0 \\ \beta_2 & 0 & d & 0 & \dots & 0 \\ \beta_3 & 0 & 0 & d & \dots & 0 \\ \vdots & \vdots & \vdots & \vdots & \ddots & \vdots \\ \beta_{n-1} & 0 & 0 & 0 & \dots & d \end{pmatrix} \quad [\text{Eq. 33}]$$

with $\beta_i = \gamma_{0,i} = \gamma_{i,0}$. Note that $Xz$ and $\|z\|^2$ satisfy the conditions required for the interchange of partial derivatives with respect to $\alpha_i$ and $\alpha_j$ and it follows that $\gamma$ is symmetric. It is only necessary to compute $\psi_{0,0}$, the first tuple of $\psi_{*,0}$.

Consider now the computation of $\psi_{*,0}$. Let the matrices E, P, and F be defined as, $$E = \begin{pmatrix} 1 & 0 & 0 & 0 & \dots & -\frac{\beta_0}{\beta_{n-1}} \\ 0 & 1 & 0 & 0 & \dots & -\frac{\beta_1}{\beta_{n-1}} \\ 0 & 0 & 1 & 0 & \dots & -\frac{\beta_2}{\beta_{n-1}} \\ 0 & 0 & 0 & 1 & \dots & -\frac{\beta_3}{\beta_{n-1}} \\ \vdots & \vdots & \vdots & \vdots & \ddots & \vdots \\ 0 & 0 & 0 & 0 & \dots & 1 \end{pmatrix} \quad [\text{Eq. 34}]$$

$$P = \begin{pmatrix} 0 & 0 & 0 & 0 & \dots & 1 \\ 0 & 1 & 0 & 0 & \dots & 0 \\ 0 & 0 & 1 & 0 & \dots & 0 \\ 0 & 0 & 0 & 1 & \dots & 0 \\ \vdots & \vdots & \vdots & \vdots & \ddots & \vdots \\ 1 & 0 & 0 & 0 & \dots & 0 \end{pmatrix} \quad [\text{Eq. 35}]$$

$$F = \begin{pmatrix} 1 & 0 & 0 & 0 & \dots & 0 \\ 0 & 1 & 0 & 0 & \dots & 0 \\ 0 & 0 & 1 & 0 & \dots & 0 \\ 0 & 0 & 0 & 1 & \dots & 0 \\ \vdots & \vdots & \vdots & \vdots & \ddots & \vdots \\ 0 & -\frac{\beta_1}{d} & -\frac{\beta_2}{d} & -\frac{\beta_3}{d} & \dots & 1 \end{pmatrix} \quad [\text{Eq. 36}]$$

Thus, $$E\gamma = \begin{pmatrix} 0 & \beta_1 & \beta_2 & \beta_3 & \dots & \beta_{n-1} - d\frac{\beta_0}{\beta_{n-1}} \\ 0 & d & 0 & 0 & \dots & -d\frac{\beta_1}{\beta_{n-1}} \\ 0 & 0 & d & 0 & \dots & -d\frac{\beta_2}{\beta_{n-1}} \\ 0 & 0 & 0 & d & \dots & -d\frac{\beta_3}{\beta_{n-1}} \\ \vdots & \vdots & \vdots & \vdots & \ddots & \vdots \\ \beta_{n-1} & 0 & 0 & 0 & \dots & d \end{pmatrix} \quad [\text{Eq. 37}]$$

$$PE\gamma = \begin{pmatrix} \beta_{n-1} & 0 & 0 & 0 & \dots & d \\ 0 & d & 0 & 0 & \dots & -d\frac{\beta_1}{\beta_{n-1}} \\ 0 & 0 & d & 0 & \dots & -d\frac{\beta_2}{\beta_{n-1}} \\ 0 & 0 & 0 & d & \dots & -d\frac{\beta_3}{\beta_{n-1}} \\ \vdots & \vdots & \vdots & \vdots & \ddots & \vdots \\ 0 & \beta_1 & \beta_2 & \beta_3 & \dots & \beta_{n-1} - d\frac{\beta_0}{\beta_{n-1}} \end{pmatrix} \quad [\text{Eq. 38}]$$

$$FPE\gamma = \begin{pmatrix} \beta_{n-q} & 0 & 0 & 0 & \dots & d \\ 0 & d & 0 & 0 & \dots & -d\frac{\beta_1}{\beta_{n-1}} \\ 0 & 0 & d & 0 & \dots & -d\frac{\beta_2}{\beta_{n-1}} \\ 0 & 0 & 0 & d & \dots & -d\frac{\beta_3}{\beta_{n-1}} \\ \vdots & \vdots & \vdots & \vdots & \ddots & \vdots \\ 0 & 0 & 0 & 0 & \dots & \frac{-d\beta_0 + \sum_{i=1}^{n-1} \beta_i^2}{\beta_{n-1}} \end{pmatrix} \quad [\text{Eq. 39}]$$

Similarly, $$E \begin{pmatrix} 1 \\ 0 \\ 0 \\ 0 \\ \vdots \end{pmatrix} = \begin{pmatrix} 1 \\ 0 \\ 0 \\ 0 \\ \vdots \end{pmatrix} \quad [\text{Eq. 40}]$$

$$PE \begin{pmatrix} 1 \\ 0 \\ 0 \\ 0 \\ \vdots \end{pmatrix} = \begin{pmatrix} 0 \\ 0 \\ 0 \\ \vdots \\ 1 \end{pmatrix} \quad [\text{Eq. 41}]$$

$$FPE \begin{pmatrix} 1 \\ 0 \\ 0 \\ 0 \\ \vdots \end{pmatrix} = \begin{pmatrix} 0 \\ 0 \\ 0 \\ \vdots \\ 1 \end{pmatrix} \quad [\text{Eq. 42}]$$

Therefore, multiplication of both sides of Equation 32 by FPE yields, $$\begin{pmatrix} \beta_{n-1} & 0 & 0 & 0 & \cdots & d \\ 0 & d & 0 & 0 & \cdots & -d\frac{\beta_1}{\beta_{n-1}} \\ 0 & 0 & d & 0 & \cdots & -d\frac{\beta_2}{\beta_{n-1}} \\ 0 & 0 & 0 & d & \cdots & -d\frac{\beta_3}{\beta_{n-1}} \\ \vdots & \vdots & \vdots & \vdots & \ddots & \vdots \\ 0 & 0 & 0 & 0 & \cdots & \frac{-d\beta_0 + \sum_{i=1}^{n-1}\beta_i^2}{\beta_{n-1}} \end{pmatrix} \psi_{*,0} = \begin{pmatrix} 0 \\ 0 \\ 0 \\ 0 \\ \vdots \\ 1 \end{pmatrix} \quad [\text{Eq. 43}]$$

From Equation 43, $$\psi_{n-1,0} = \frac{\beta_{n-1}}{-d\beta_o + \sum_{i=1}^{n-1}\beta_i^2} \quad [\text{Eq. 44}]$$

and, $$\psi_{0,0} = \frac{d}{d\beta_0 - \sum_{i=1}^{n-1}\beta_i^2} \quad [\text{Eq. 45}]$$

$\psi_{0,0}$ may be computed from $\beta$ in accordance with Equation 45.

Consider now the computation of $\beta$. $\beta$ is given by the first row (or column) of $\gamma$, and thus from Equation 26, $$\beta_i = -E\left\{\frac{\partial^2}{\partial\alpha_i\partial\phi}\log p(y\mid\alpha)\right\} \quad [\text{Eq. 46}]$$

where $\alpha_j=\phi$ for the first row of $\gamma$. Examination of Equations 26, 30 and 31 reveals that $\sigma$ has no effect on the solution of Equation 31. For the purposes of computing X, $\sigma=1$ may be used. Thus from equation 30, $$\beta_i = \frac{k}{2}\frac{\partial^2}{\partial\alpha_i\partial\phi}\|z\|^2 - \text{Re}\left\{(Xz)^*\frac{\partial^2}{\partial\alpha_i\partial\phi}Xz\right\} \quad [\text{Eq. 47}]$$

It was previously shown that $$\frac{\partial^2}{\partial\alpha_i\partial\alpha_j}\|z\|^2$$

will be nonzero only when $\alpha_i=\alpha_j$ and $\alpha_i,\alpha_j\neq\phi$. Hence, $$\beta_i = -\text{Re}\left\{(Xz)^*\frac{\partial^2}{\partial\alpha_i\partial\phi}Xz\right\} \quad [\text{Eq. 48}]$$

With multiple boundaries Xz may be written as, $$Xz = \begin{pmatrix} z_0 e^{i\mu 0(\phi)} \\ z_0 e^{i\mu 1(\phi)} \\ z_1 e^{i\mu 2(\phi)} \\ z_1 e^{i\mu 3(\phi)} \\ z_2 e^{i\mu 4(\phi)} \\ z_2 e^{i\mu 5(\phi)} \\ \vdots \end{pmatrix} \quad [\text{Eq. 49}]$$

Therefore, $$\frac{\partial^2}{\partial\text{Re}\alpha_k\partial\phi}Xz = \begin{pmatrix} \vdots \\ 0 \\ i\mu'_{2k+0}(\phi)e^{i\mu_{2k+0}(\phi)} \\ i\mu'_{2k+1}(\phi)e^{i\mu_{2k+1}(\phi)} \\ 0 \\ \vdots \end{pmatrix}$$

$$\Rightarrow (Xz)^*\frac{\partial^2}{\partial\text{Re}\alpha_k\partial\phi}Xz = iz_k^*(\mu'_{2k+0}(\phi)+\mu'_{2k+1}(\phi))$$

$$\Rightarrow -\text{Re}\left\{(Xz)^*\frac{\partial^2}{\partial\text{Re}\alpha_k\partial\phi}Xz\right\} = -\text{Im}z_k\{\mu'_{2k+0}(\phi)+\mu'_{2k+1}(\phi)\}$$

Similarly, $$-\text{Re}\left\{(Xz)^*\frac{\partial^2}{\partial\text{Im}\alpha_k\partial\phi}Xz\right\} = +\text{Re}z_k\{\mu'_{2k+0}(\phi)+\mu'_{2k+1}(\phi)\} \quad [\text{Eq. 51}]$$

Equations 50 and 51 may be used to evaluate $\beta_i$ in equation 48 for i>0. For i=0, $$\frac{\partial^2}{\partial\phi^2}e^{i\mu(\phi)} = \{i\mu''(\phi)-\mu'(\phi)^2\}e^{i\mu(\phi)} \quad [\text{Eq. 52}]$$

$$\Rightarrow \overline{ze^{i\mu(\phi)}}\frac{\partial^2}{\partial\phi^2}ze^{i\mu(\phi)} = |z|^2\{i\mu''(\phi)-\mu'(\phi)^2\}$$

$$\Rightarrow -\text{Re}\left\{\overline{ze^{i\mu(\phi)}}\frac{\partial^2}{\partial\phi^2}ze^{i\mu(\phi)}\right\} = |z|^2\mu'(\phi)^2$$

$$\Rightarrow -\text{Re}\left\{(Xz)^*\frac{\partial^2}{\partial\phi^2}Xz\right\} = \sum_k |z_k|^2\{\mu'_{2k+0}(\phi)^2+\mu'_{2k+1}(\phi)^2\}$$

Consider now the computation of d.

$$d = \frac{k}{2}\frac{\partial^2}{\partial\alpha_i^2}\|z\|^2 - \text{Re}\left\{(Xz)^*\frac{\partial^2}{\partial\alpha_i^2}Xz\right\} \quad [\text{Eq. 53}]$$

where $\alpha_i\neq\phi$. It was previously shown that $$\frac{\partial^2}{\partial\alpha_i\partial\alpha_j}Xz$$

will be nonzero only when $\alpha_i = \phi$ or $\alpha_j = \phi$. Hence, $$d = \frac{k}{2} \frac{\partial^2}{\partial \alpha_i^2} \|z\|^2 \quad [\text{Eq. 54}]$$

k is defined as X*X=kI, and so k=2. Thus, $$d = \frac{\partial^2}{\partial \alpha_i^2} \|z\|^2 \quad [\text{Eq. 55}]$$

Therefore, $$d = \frac{\partial^2}{\partial \text{Re} \alpha_i^2} \|z\|^2 = \frac{\partial^2}{\partial \text{Re} \alpha_i^2} \sum_k (\text{Re}\alpha_k^2 + \text{Im}\alpha_k^2) = 2 \quad [\text{Eq. 56}]$$

Referring again to the objective in Equation 31 and to the expression for $\psi_{0,0}$ in equation 45, since d is a constant, the minimum occurs when $$d\beta_0 - \sum_{i=1}^{n-1} \beta_i^2$$

is maximum. From equations 52 and 56, $$d\beta_0 = 2 \sum_k |z_k|^2 \{\mu'_{2k+0}(\phi)^2 + \mu'_{2k+1}(\phi)^2\} \quad [\text{Eq. 57}]$$

From equations 50 and 51, $$\beta_1^2 + \beta_2^2 = |z_0|^2 \{\mu'_0(\phi) + \mu'_1(\phi)\}^2 \quad [\text{Eq. 58}]$$

and, $$\sum_{i=1}^{n-1} \beta_i^2 = \sum_k |z_k|^2 \{\mu'_{2k+0}(\phi) + \mu'_{2k+1}(\phi)\}^2 \quad [\text{Eq. 59}]$$

Thus, $$d\beta_0 - \sum_{i=1}^{n-1} \beta_i^2 = \sum_k |z_k|^2 \{\mu'_{2k+0}(\phi) - \mu'_{2k+1}(\phi)\}^2 \quad [\text{Eq. 60}]$$

Determination of the optimal X is equivalent to the determination of each $\mu_i(\phi)$. When the choice of $\mu_i(\phi)$ does not constrain the choice of $\mu_j(\phi)$ for $i \neq j$, Equation 60 reduces simply to, $$X = \text{argmax}_X \{\mu'_{2k+0}(\phi) - \mu'_{2k+1}(\phi)\}^2 \forall k \quad [\text{Eq. 61}]$$

In other cases that are constrained dynamic programming may be used. Note also that with phased-arrays each $\mu_i(\phi)$ is a linear combination of (two) translated sinusoidal functions of $\phi$, and so each $\mu'_i(\phi)$ is simply a linear combination of (two) translated sinusoidal functions of $\phi$. Thus, from a computational perspective, Equation 61 is simple to apply.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The invention claimed is:

1. A method of estimating the angle of arrival of a target signal received by an antenna system, comprising the steps of:
   (a) obtaining disparate observations of a target signal received by an antenna system; and
   (b) with a computer, processing the obtained disparate observations of the signal to select a subset of said disparate observations of the signal for processing to enable an optimal estimation of the angle of arrival of the signal.

2. A method according to claim 1, further comprising the steps of:
   (c) subsequent to step (b), obtaining the subset of said disparate observations of the signal; and
   (d) with a computer, processing the subsequently obtained subset of said disparate observations to obtain the optimal estimate of the angle of arrival of the signal.

3. A method according to claim 1, where step (b) comprises the steps of:
   (c) processing the disparate observations of the signal to provide a plurality of estimates of the angle of arrival of the signal; and
   (d) processing the plurality of estimates to determine the subset in accordance with which of the estimates is an optimal estimation of the angle of arrival of the signal.

4. A method according to claim 3, wherein step (c) comprises the step of:
   (e) using maximum-likelihood processing to estimate the angle of arrival of the target signal.

5. A method according to claim 4, wherein step (e) comprises the step of:
   (f) making the maximum-likelihood-estimation of the angle of arrival $\phi$ of the target signal in accordance with the equation:

$$\phi_{MLE} = \text{argmin}_\phi \|y - Xz\|^2$$

wherein $$y = Xz + v$$

$$X = \begin{pmatrix} e^{i\cos(\phi + \tau_1)} & & & \\ & e^{i\cos(\phi + \tau_2)} & & \\ & & e^{i\cos(\phi + \tau_3)} & \\ & & & e^{i\cos(\phi + \tau_4)} \end{pmatrix}$$

z is a vector of length two that represents unknown modulation of the target signal, v is random noise, and
T is determined by the particular disparate observation of the target signal.

6. A method according to claim 3, wherein step (d) comprises the step of:
(e) using minimization of variance of the estimates of the angle of arrival as a criterion for determining which of said estimates is an optimal estimation of the angle of arrival.

7. A method according to claim 6, wherein step (e) comprises the step of:
(f) determining said variance for a particular said estimate by using a Cramer-Rao bound derived from a prior said determination of a said particular estimate as an optimal estimation of the angle of arrival.

8. A method according to claim 7, wherein step (f) comprises the step of:
(g) determining the variance bound for said particular estimate of the angle of arrival by using the equations:

$$Var\{\alpha_i\} \geq \phi_{i,i}.$$

$$\phi = \gamma^{-1}$$

$$\gamma_{i,j} = -E\left\{\frac{\partial^2}{\partial \alpha_i \partial \alpha_j} \log p(y \mid \alpha)\right\}$$

wherein i and j are indices for a matrix of possible values of $\gamma$, $$\alpha = (\phi, \text{Re}z_0, \text{Im}z_0, \text{Re}z_1, \text{Im}z_1, \ldots),$$

$$E\left\{\frac{\partial^2}{\partial \alpha_i \partial \alpha_j} \log p(y \mid \alpha)\right\} = \frac{1}{\sigma^2} \text{Re}\left\{(Xz) * \frac{\partial^2}{\partial \alpha_i \partial \alpha_j} Xz\right\} - \frac{k}{2\sigma^2} \frac{\partial^2}{\partial \alpha_i \partial \alpha_j} \|z\|^2$$

$$X = \begin{pmatrix} e^{i\cos(\phi + \tau_1)} & & & \\ e^{i\cos(\phi + \tau_2)} & & & \\ & & e^{i\cos(\phi + \tau_3)} & \\ & & & e^{i\cos(\phi + \tau_4)} \end{pmatrix}$$

z is a complex vector of length two that represents unknown modulation of the target signal,
T is determined by the particular disparate observation of the target signal,
$\sigma^2$ is the variance of distribution of random noise, and
k is a scalar.

9. A method according to claim 8, wherein step (b) comprises the step of:
(h) determining said optimal estimation in accordance with the equation:

$$X = \text{argmin}_x \psi_{0,0}$$

wherein $\psi_{0,0}$ is the inverse matrix of the variance bound matrix for said particular estimate of the angle of arrival.

10. A method according to claim 8, wherein step (b) comprises the step of:
(h) determining said optimal estimation in accordance with the equation:

$$X = \text{argmax}_x \{\mu'_{2k+0}(\phi) - \mu'_{2k+1}(\phi)\}^2 \forall k$$

wherein $\mu'_i(\phi)$ is a linear combination of two translated sinusoidal functions of $\phi$.

11. A method according to claim 1, wherein step (a) comprises the step of:
(c) obtaining the disparate observations from different antenna elements of the antenna system.

12. A method according to claim 1, wherein step (a) comprises the step of:
(c) obtaining the disparate observations from different elements of a commutated antenna array of the antenna system.

13. A method according to claim 1, wherein step (a) comprises the step of:
(c) obtaining the disparate observations at different times.

14. A method according to claim 1, wherein step (a) comprises the step of:
(c) obtaining the disparate observations at different frequencies.

15. A method according to claim 1, wherein step (a) comprises the step of:
(c) obtaining the disparate observations by using different CDMA signal access codes.

16. A system for estimating the angle of arrival of a target signal received by an antenna system, comprising the steps of:
means for obtaining disparate observations of a target signal received by an antenna system; and
a computer adapted for processing the obtained disparate observations of the signal to select a subset of said disparate observations of the signal for processing to enable an optimal estimation of the angle of arrival of the signal.

17. A nontransitory computer readable storage medium for use with a computer in a system for estimating the angle of arrival of a target signal received by an antenna system, wherein the system comprises: means for obtaining disparate observations of the signal; and a computer,
wherein the computer readable storage medium contains computer executable program instructions for causing the computer to perform the step of:
(a) with a computer, processing the obtained disparate observations of the signal to select a subset of said disparate observations of the signal for processing to enable an optimal estimation of the angle of arrival of the signal.

18. A nontransitory computer readable storage medium according to claim 17, wherein the means for obtaining disparate observations of the signal are adapted for subsequently obtaining the subset of said disparate observations of the signal; and wherein the computer readable storage medium further contains computer executable program instructions for causing the computer to perform the step of:
(b) processing the subsequently obtained subset of said disparate observations to obtain the optimal estimate of the angle of arrival of the signal.

19. A nontransitory computer readable storage medium according to claim 17, wherein the computer readable storage medium contains computer executable program instructions for causing the computer to perform step (a) by performing the steps of:
(b) processing the disparate observations of the signal to provide a plurality of estimates of the angle of arrival of the signal; and
(c) processing the plurality of estimates to determine the subset of further obtained disparate observations in accordance with which of the estimates is an optimal estimation of the angle of arrival of the signal.

20. A nontransitory computer readable storage medium according to claim 19, wherein the computer readable storage medium contains computer executable program instructions for causing the computer to perform step (b) by performing the step of:

(d) using maximum-likelihood processing to estimate the angle of arrival of the signal.

21. A nontransitory computer readable storage medium according to claim 20, wherein the computer readable storage medium contains computer executable program instructions for causing the computer to perform step (d) by performing the step of:

(e) making the maximum-likelihood-estimation of the angle of arrival φ of the target signal in accordance with the equation:

$$\phi_{MLE} = \mathrm{argmin}_\phi \|y - Xz\|^2$$

wherein $$y = Xz + v$$

$$X = \begin{pmatrix} e^{i\cos(\phi + \tau_1)} & & & \\ & e^{i\cos(\phi + \tau_2)} & & \\ & & e^{i\cos(\phi + \tau_3)} & \\ & & & e^{i\cos(\phi + \tau_4)} \end{pmatrix}$$

z is a complex vector of length two that represents unknown modulation of the signal, v is random noise, and T is determined by the particular disparate observation of the signal.

22. A nontransitory computer readable storage medium according to claim 19, wherein the computer readable storage medium contains computer executable program instructions for causing the computer to perform step (c) by performing the step of:

(d) using minimization of variance of the estimates of parameter of interest as a criterion for determining which of said estimates is an optimal estimation of the parameter of interest.

23. A nontransitory computer readable storage medium according to claim 22, wherein the computer readable storage medium contains computer executable program instructions for causing the computer to perform step (d) by performing the step of:

(e) determining said variance for a particular said estimate by using a Cramer-Rao bound derived from a prior said determination of a said particular estimate as an optimal estimation of the parameter of interest.

24. A nontransitory computer readable storage medium according to claim 23, wherein the computer readable storage medium contains computer executable program instructions for causing the computer to perform step (e) by performing the step of:

(f) determining the variance bound for said particular estimate of the angle of arrival by using the equations:

$$Var\{\alpha_i\} \geq \psi_{i,i}$$

$$\psi = \gamma^{-1}$$

$$\gamma_{i,j} = -E\left\{\frac{\partial^2}{\partial \alpha_i \partial \alpha_j} \log p(y \mid \alpha)\right\}$$

wherein i and j are indices for a matrix of possible values of γ, $$\alpha = (\phi, \mathrm{Re} z_0, \mathrm{Im} z_0, \mathrm{Re} z_1, \mathrm{Im} z_1, \ldots),$$

$$E\left\{\frac{\partial^2}{\partial \alpha_i \partial \alpha_j} \log p(y \mid \alpha)\right\} = \frac{1}{\sigma^2} \mathrm{Re}\left\{(Xz) * \frac{\partial^2}{\partial \alpha_i \partial \alpha_j} Xz\right\} - \frac{k}{2\sigma^2} \frac{\partial^2}{\partial \alpha_i \partial \alpha_j} \|z\|^2$$

$$X = \begin{pmatrix} e^{i\cos(\phi + \tau_1)} & & & \\ & e^{i\cos(\phi + \tau_2)} & & \\ & & e^{i\cos(\phi + \tau_3)} & \\ & & & e^{i\cos(\phi + \tau_4)} \end{pmatrix}$$

z is a complex vector of length two that represents unknown modulation of the target signal, T is determined by the particular disparate observation of the target signal, $\sigma^2$ is the variance of distribution of random noise, and k is a scalar.

25. A nontransitory computer readable storage medium according to claim 24, wherein the computer readable storage medium contains computer executable program instructions for causing the computer to perform step (a) by performing the step of:

(g) determining said optimal estimation in accordance with the equation:

$$X = \mathrm{argmin}_x \psi_{0,0}$$

wherein $\psi_{0,0}$ is the inverse matrix of the variance bound matrix for said particular estimate of the angle of arrival.

26. A nontransitory computer readable storage medium according to claim 24, wherein the computer readable storage medium contains computer executable program instructions for causing the computer to perform step (a) by performing the step of:

(g) determining said optimal estimation in accordance with the equation:

$$X = \mathrm{argmax}_x \{\mu'_{2k+0}(\phi) - \mu'_{2k+1}(\phi)\}^2 \forall k$$

wherein $\mu'_i(\phi)$ is a linear combination of two translated sinusoidal functions of φ.

* * * * *

UNITED STATES PATENT AND TRADEMARK OFFICE
CERTIFICATE OF CORRECTION

PATENT NO. : 8,179,319 B1  Page 1 of 1
APPLICATION NO. : 12/337219
DATED : May 15, 2012
INVENTOR(S) : James Covosso Francis It is certified that error appears in the above-identified patent and that said Letters Patent is hereby corrected as shown below:

at column 9, line 1, after "various" insert -- $\gamma. \psi^\bullet_{,0}$ -- at column 10, line 25, "$\beta_{n-q}$" should be -- $\beta_{n-1}$ -- at column 15, line 21, "Var{ $\alpha_i$} $\geq \phi_{i,z}$." should be -- Var{$\alpha_i$} $\geq \psi_{i,i}$ -- at column 15, line 24, "$\phi = \gamma^{-1}$" should be -- $\psi = \gamma^{-1}$ --

Signed and Sealed this
Twenty-seventh Day of November, 2012

David J. Kappos
*Director of the United States Patent and Trademark Office*